US012750463B1

(12) United States Patent
Gotlieb

(10) Patent No.: US 12,750,463 B1
(45) Date of Patent: Sep. 29, 2026

(54) SYSTEM AND METHOD FOR GENERATING VIDEO IMAGES USING PERSONALIZED MAKE UP

(71) Applicant: Charles E. Gotlieb, San Juan, PR (US)

(72) Inventor: Charles E. Gotlieb, San Juan, PR (US)

( * ) Notice: Subject to any disclaimer, the term of this patent is extended or adjusted under 35 U.S.C. 154(b) by 97 days.

(21) Appl. No.: 18/601,694

(22) Filed: Mar. 11, 2024

Related U.S. Application Data

(60) Provisional application No. 63/488,882, filed on Mar. 7, 2023.

(51) Int. Cl.
*H04N 7/15* (2006.01)
*G06T 5/20* (2006.01)
*G06T 5/50* (2006.01)
*G06V 40/16* (2022.01)

(52) U.S. Cl.
CPC ............... *H04N 7/152* (2013.01); *G06T 5/20* (2013.01); *G06T 5/50* (2013.01); *G06V 40/168* (2022.01); *G06T 2207/20221* (2013.01)

(58) Field of Classification Search
None
See application file for complete search history.

(56) References Cited

U.S. PATENT DOCUMENTS 7,612,794 B2 * 11/2009 He ........................ H04N 7/147 348/348
2005/0157866 A1 * 7/2005 Marton .................. H04M 9/08 379/406.01
2012/0320141 A1 * 12/2012 Bowen ..................... H04N 7/15 348/E7.083
2021/0345016 A1 * 11/2021 Nakano ............... G06F 18/2413

* cited by examiner

*Primary Examiner* — Hemant S Patel
(74) *Attorney, Agent, or Firm* — Innovation Partners LLC; Charles E. Gotlieb

(57) ABSTRACT

A system and method uses photographs of an individual wearing make up and, without requiring the individual to be wearing make up, applies the individual's make up to the images of the individual in the frames of a video session, such as a conventional videoconference. Audio may be received corresponding to the frames and may be delayed to correspond to the processing delay used to apply make up to the frames.

18 Claims, 3 Drawing Sheets

SYSTEM AND METHOD FOR GENERATING VIDEO IMAGES USING PERSONALIZED MAKE UP

RELATED APPLICATION

This application claims the benefit of U.S. Patent Application Ser. No. 63/488,882 entitled 'Method and Apparatus for Generating Video Images Using Personalized Make Up', filed by Charles E. Gotlieb on Mar. 7, 2023

FIELD OF THE INVENTION

The present invention is related to computer software and hardware and more specifically to computer software and hardware for video signal processing.

BACKGROUND OF THE INVENTION

Computer video equipment strives to provide a pleasing yet realistic image of people. For example, conventional video conferencing software attempts to provide pleasing, yet realistic images of the people on the videoconference. Present methods of providing such video images are substandard. What is needed is a system and method that can provide pleasing, yet realistic video images of people, for example in videoconferences.

SUMMARY OF INVENTION

A system and method uses a camera coupled to a computer to take photographic images of people wearing no make up, as well as images of people wearing make up. The images are divided into zones and then characteristics of zones from the made-up images are recorded, as well as the differences between the characteristics of the corresponding zones in the un-made-up images. The photographic images may be taken as a full front, each side and quarter turn, in between full front and full side.

The zones may be identified relative to facial and other body features, like eyes, nose, nostrils, mouth, eyebrows, chin and the outline of the face and hairline, as well as locations of colors, such as where the individual has applied blush on the cheeks and the like. For example, a zone may include the eyeliner around an eye, with the thickness of the zone determined by how thick the made-up photo shows eyeliner at that point.

In one embodiment, the system and method may be implemented as a conventional camera driver registered as a camera, and optionally, a microphone, to an operating system. The camera driver takes the input from the driver output of a driver of a conventional physical computer camera and then processes it to provide output in the same manner as a second camera driver, thus operating as a virtual camera: one with a driver but without a separate physical camera, that pipelines the output from the driver of the physical camera and then outputs it as a separate camera driver. It is noted that this driver is virtual in that it is not for processing images received from a hardware element, but is intended to receive input from a driver for a physical hardware element.

In one embodiment, in addition to, or instead of, identifying colors of a made up person, the system and method provides various potential overlays from which the user can select to place at locations relative to the zones identified. For example, the user can select an overlay of a certain size to use for blush on cheeks. The overlays would be placed over the users cheeks as the user selects them. There may be multiple sizes from which to select, and the overlays may have different colors to allow the user to select the overlay with the color and size desired to represent the make up look they desire. In one embodiment, once selected, attributes of the overlays may be changed using a user interface presented to the user, so that the user can modify the size, color, opacity or other characteristics of that overlay. Overlays may be selected for foundation, blush, highlights or contours, lips, lip liner, eyes, upper and lower eyeliner, eyelids, eyebrows, eyelashes and the like. In one embodiment, a suggested overlay and characteristics of that overlay for each item is made using the made up images to most closely match the made up images.

When the individual uses the physical camera for video, such as to be part of a video conference using a video server, the system and method accepts the video frames from the driver of the physical camera, identifies the zones on their face and neck and chest, provides the characteristics from the made-up photo or the overlays with the characteristics selected at the zone or relative to the zone, optionally provides additional processing such as blurring, then outputs the frame as a conventional camera driver, and the video conferencing system uses the frame as its input. All such video frames from the video conference or other application are processed in this manner. The result is to cause the video image of the un-made-up person to appear as if they are wearing the same make up they wore in the made-up photographic images or that which they designed using the overlays. The overlays may be custom made for each frame using the shape that either matches a zone on that frame detected for a facial feature, such as lips, or is sized and shaped according to one or more detected zones corresponding to facial features, such as eyes, nose and chin to identify the orientation of the user's face and change the shape of the blush according to the orientation of the face. Zones may be identified for off-face features such as neck, ears, hair and the like. The overlay may only be shaped to match the zones of some frames but not all of them as the shape of the zones may not change sufficiently to require shaping the overlay for each frame, and so the shape of the zone may be reused for one or more frames.

In one embodiment, the audio is accepted from the physical camera driver or a microphone and output from the second driver with a delay to match the delay caused by processing the video portion of the frame.

The system and method provides one or more user interface controls, such as one or more sliders to allow the individual to control the intensity of the applied characteristics over the video frames, so that a combination of natural and made-up characteristics can be generated and output for each of the zones. In one embodiment, the difference between the un-made-up photos and the made-up photos is used allow the individual to use the user interface controls to provide a greater difference than was captured in the made-up photos when the user interface control is at the top of its range.

More than one set of made-up photos or sets of overlays or both may be received and the individual is allowed to select from among them to achieve different "looks" on the output video.

DETAILED DESCRIPTION OF A PREFERRED EMBODIMENT

Figure 1:
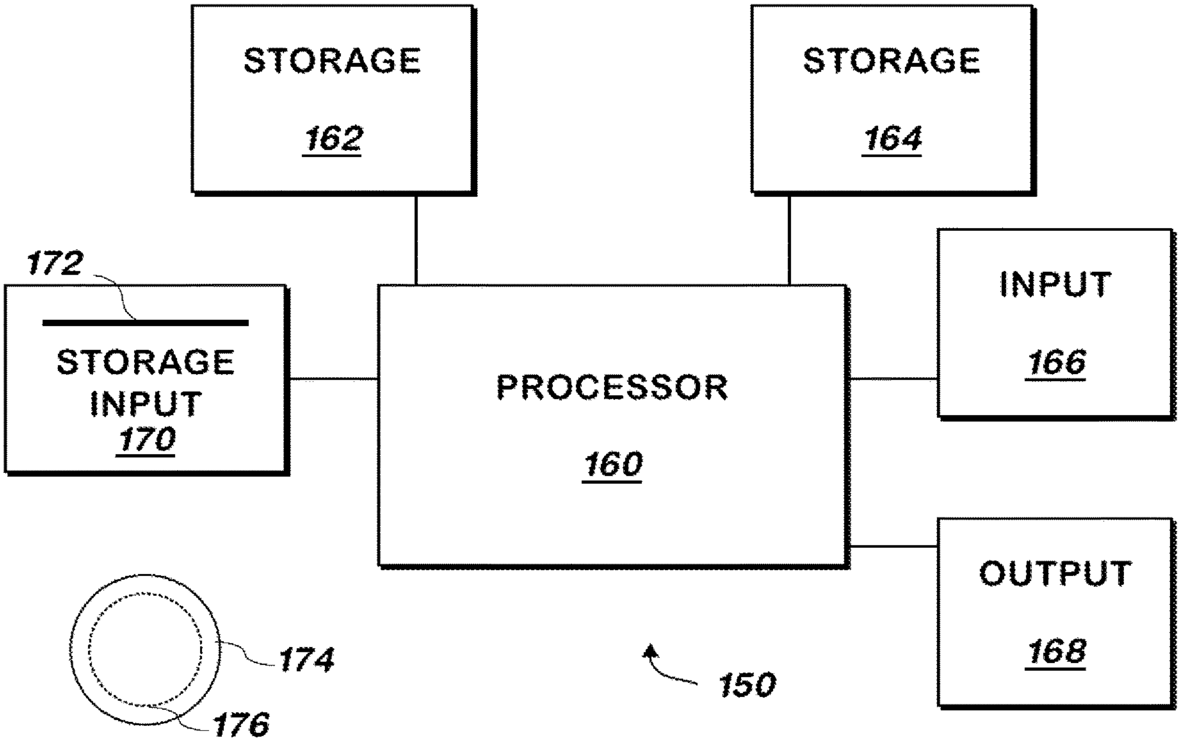
FIG 1 (PRIOR ART)
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, California, a CORE-compatible personal computer system such as are available from DELL COMPUTER CORPORATION of Round Rock, Texas running a version of the WINDOWS operating system (such as WINDOWS 10) commercially available from MICROSOFT Corporation of Redmond Washington or a Macintosh computer system running the MACOS (such as Mojave) or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2:
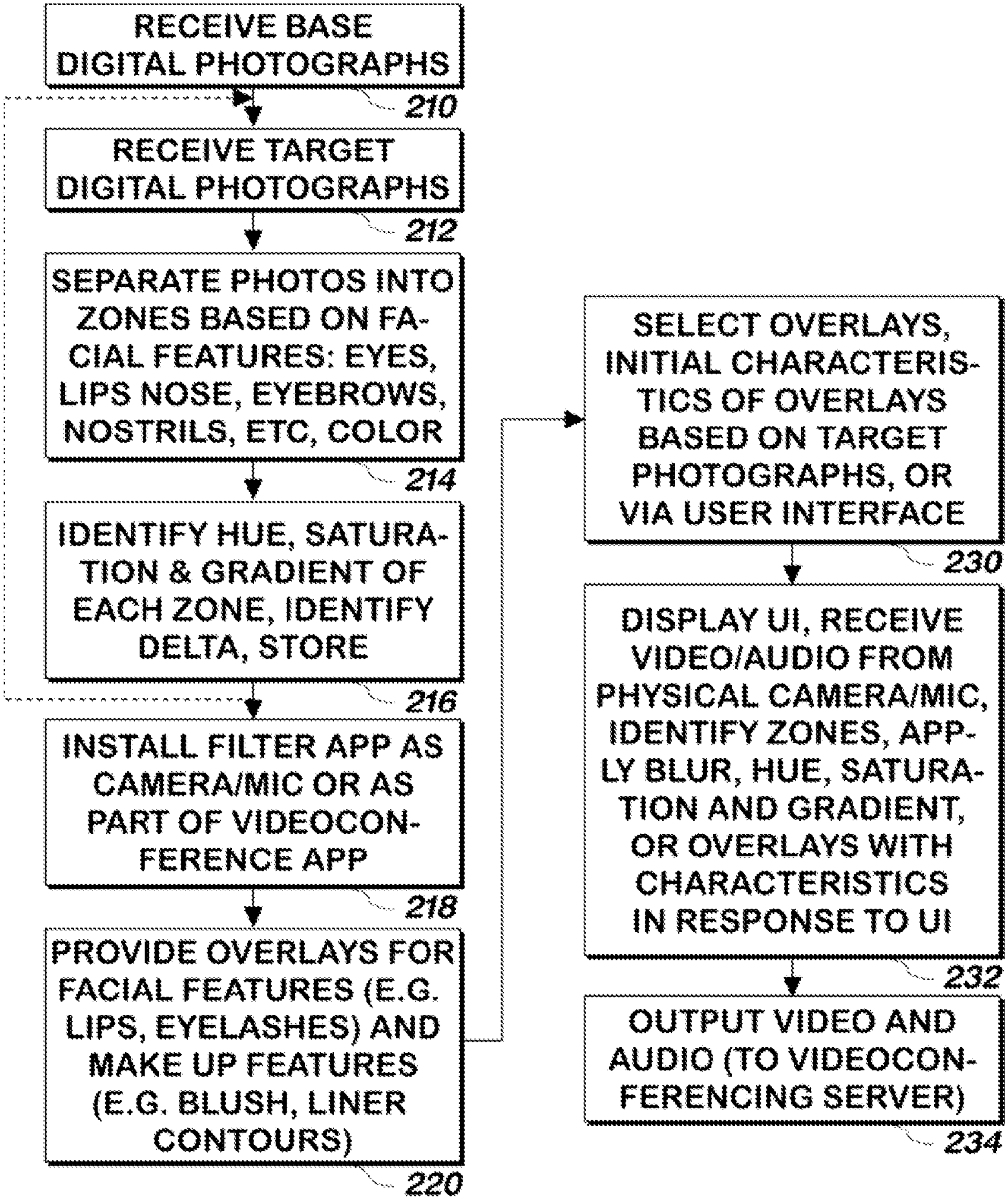
FIG. 2, is a flowchart illustrating a method of providing audio and video output according to one embodiment of the present invention.

Referring now to FIG. 2, a method of providing audio and video output is shown according to one embodiment of the present invention. The method is shown in the context of a videoconference, though the audio and video output may be used for other purposes as well. A set of one or more base digital photographs are received 210 using a camera connected to a computer system. In one embodiment, the base photographs are photographs of at least the face and neck of an individual, from different perspectives, when the individual is in the same state as they will be on the videoconferences. For example, the base photographs include head and neck photographs of an individual who is not wearing makeup, from the front, each sides showing a silhouette, and halfway between each of the sides, referred to herein as a quarter turn.

A set of one or more target digital photographs are received 212, using the camera connected to the computer system. In one embodiment, the target photographs show the same individual from the same perspectives as described above, wearing makeup or having other characteristics that the individual desires to show in the videoconferences.

Base digital photographs or target digital photographs may be individual frames of a video. In one embodiment, no base digital photographs or target digital photographs are received.

The heads and necks in the digital photographs received are separated 214 into zones, with the zones corresponding to facial features, such as the edges of eyes, the edges of the lips, the edges and nostrils of the individual's nose, the individual's eyebrows, the individual's chin, and so on. Zones may be based on colors in the digital photographs instead of, or in addition to the facial features. For example, if the individual has incorporated blush on their cheeks, the area containing the color of the blush may define a zone. In one embodiment, boundaries of the zones are identified using an X-Y coordinate system, where the tip of the chin defines 0,0 and the center point between the highest part of the individual's eyebrows defines 0,0, for example. And X-Y-Z coordinate system may be used in one embodiment. In one embodiment, the conventional MEDIAPIPE program with the facial recognition filter available from ALPHABET, INC. of Mountain View, CA is used to identify zones in the digital photographs described herein.

Characteristics of each zone are identified 216. In one embodiment, characteristics include hue, saturation, and other characteristics related to color, such as a measure of a gradient of the color around the edges of the zone. A difference in characteristics, referred to herein as Delta, between the base digital photographs and the target digital photographs is identified as part of step 216, and all such information is stored, along with zone identifier and boundary information for the zone.

In one embodiment, the individual may record multiple sets of target digital photographs, each set to be stored and processed as a different "look" and each set of target digital photographs are processed as described above with respect to steps 212 through 216, with data storage being associated with an identifier, such as a name, of the look.

At any time, a filter application may be installed 218. The filter application may be installed as a camera driver, and optionally a microphone driver, on the operating system of the individual's computer system, or the filter may be installed as part of a videoconferencing application or other videoconferencing software. If installed as a camera driver, and optionally a microphone driver, on the individual's computer system, (i.e as a video camera with both audio and video) the filter application will receive the output of a physical camera driver, and optionally microphone driver, on such computer system, as selected by the user as input to the filter application, and after filtering as described herein, will provide the filtered output in the same manner as a conventional camera driver. Such camera driver and microphone driver may each be selected as a camera and microphone by conventional videoconferencing software installed or otherwise interconnected with the individual's computer system. The filter application thus operates as a virtual video camera driver that is selectable like a video camera but does not connect directly to a physical video camera, but requires an additional video camera driver between itself and the physical camera and microphone that makes up a video camera. The filter application installation 218 may be performed before step 210, for example, and the filter app may perform any of the functions described herein using frames or other digital photographs from the camera.

In one embodiment, the filter application identifies itself to the operating system of the user's computer system as the type of physical camera that was identified to it and passes through commands received regarding frame rate, resolution and the like, to the physical camera driver the user configured to the filter application. Such commands may be proprietary commands or non-proprietary commands such as WINDOWS DIRECTSHOW or MACOS AVFOUNDATION commands. Alternatively, the filter application identifies itself as a specified type of camera that uses the non-proprietary commands or one proprietary set of commands and then performs a translation of the commands it receives from video conferencing software to that required by the driver of the physical camera configured to it.

In one embodiment, a set of images of facial features, made up facial features, and shapes of make up features are provided as overlays. Facial features may be eyelashes and eyebrows, which may or may not have make up applied. Make up features may be lip shades, lip liner, eye liner, eyelid shades, foundation, various blush images of various sizes, shapes and positions, and contouring and highlighting images of various shapes and orientations. For example, the image of a blush make up feature may be an oval or circle or two of them, the precise size and distances between one another to be placed based on facial features. Any of these may be supplied with a base color and/or opacity, which may be the color and/or opacity at a certain point, with the other colors and/or opacity used in the same item relative to the base color and/or opacity. For example, blush may be supplied as a circle or oval with a certain color and opacity at its center, where the opacity is lower as the distance from the center increases.

In one embodiment, overlays and their characteristics are initially selected 230 based on the target digital photographs, to match the color, shape, or size or are set with an initial color, shaped or sized based on the target digital photographs, to closely or most closely approximate the characteristics at the corresponding location on the target digital photographs where such overlays would be expected to appear. For example, a blush overlay may be selected from one of many overlays provided or it may have a base color that approximates the base color of one or more of the target digital photographs and has a similar size and shape, or a single blush overlay may have been provided and it is selected and initially sized, shaped or colored to approximate what appears on the target digital photographs. The initial color of the overlay may be dependent on the target digital photographs at the approximate cheek position where blush would be expected to be placed, or the location near that location where the color is the darkest hue of the hue around that location.

In one embodiment, a user interface is provided to the user as part of step 230 to allow the user to manually select, and change characteristics of, overlays, or change characteristics of zones, to be applied to the user video. The characteristics can include color, hue and saturation, opacity, size and shape. The overlays may be displayed as selected or as modified to show the overlays as applied to user video from the filter app or as applied to one or more base digital photographs, and the user may change overlays or their characteristics and the selected overlays or their characteristics are displayed to the user in place of the overlays last displayed. A tabbed interface may be used for each feature, such as lips, eyelashes, eyebrows, eye shades, foundation, blush etc. There may be multiple overlays for each of these features and the selection of the overlays can involve selection of the overlay for each of several features from among multiple overlays for each respective feature. For example, the user may select an overlay for eyelashes among several overlays for eyelashes. Multiple looks may be defined as described herein, each with its own combination of overlays and characteristics for that look.

A user interface is displayed, video and audio is received from a conventional camera and microphone, and for every frame, the zones are identified on the frame using the physical attributes of the individual, who may not be wearing make up, and some of the zones may be blurred to even skin tone, and the hue and saturation from the target digital photograph or the overlays and characteristics specified above are shaped according to the shape of the zones, and in this step is used to alter the video frames received from the physical camera 232. In one embodiment, this is accomplished by identifying the zones on the frame, optionally applying blur to some or all of the zones, for example by excluding eyebrows, applying the hue, saturation and gradient from the target digital photographs, or target digital photographs corresponding to the look selected by the individual via the user interface displayed, optionally in response to a user interface element, such as a slider, which is used to intensify, or de-intensify, the effect. In one embodiment, if the slider is moved near its left side, a proportion of the Delta is used for hue and/or saturation, decreasing the made-up effect and causing a more natural look than was in the target photographs. In one embodiment, if the slider is moved to the right side, an additional amount of hue and saturation beyond those of the target photographs is applied to the zones of the frames.

In the embodiment in which overlays are used, for each frame or every few frames, or for one or more base digital photographs, the overlay may be shaped and sized to a corresponding zone (for example, to fill a zone for lips) or in response to multiple zones (e.g. using the location of the nearest eye and lips to determine the shape and size of a blush overlay), and applied over the video using the color initially specified, as modified by the user interface displayed with the video image or image of one or more base digital photographs of the user that the user sees. For example, if the user wishes to modify the color of lipstick, they can do so via the user interface and on the next frame, the lips overlay will be provided as the new color. Gradients or other features may be retained, so that if the user selects an overlay in red with a gradient, the same gradient will be applied when the user selects a different color, such as pink, or the gradients or other features may be specified to change as a function of the color or opacity selected by the user and such feature will be applied to the overlay each time it is generated to apply to the frames of the video to be output. Overlays and characteristics corresponding to a selected look are used, with the user being able to change the look at any time.

The overlays are applied by setting each overlay or a set of overlays or all the overlays as a layer, and then directing the graphics program in the user's computer system to apply the layer or layers using various specified levels of opacity for each layer. For example, conventional OPENGL commands may be specified with each layer being a z-buffer texture using the OpenGL program available at opengl.org. Overlays with the same or similar opacity may be assigned to a single layer and multiple layers may be used.

In one embodiment, initially and occasionally or periodically as frames are being processed as described herein, the hue and saturation of some or all of the zones of the base digital photographs are compared against the hue and saturation of the corresponding zones in the frames, and an adjustment is made to the hue and saturation applied to the frames or of the overlays in accordance with any differences located. For example, if the user's skin tone is 5% lighter, the applied effect of the target photograph zones will also be 5% lighter. In one embodiment, the user is instructed to take the base and target digital photographs under the same lighting conditions. In one embodiment, the user may take one set of base digital photographs for each of the target digital photographs to facilitate this adjustment, if all of the target digital photographs cannot be taken under the same lighting conditions, where each set of base digital photographs and target digital photographs are taken under approximately the same lighting conditions. In another embodiment, the modifications of the frames is done based on the delta between the base digital photographs and target digital photographs instead of applying the hue and saturation from the target digital photographs to the frames, where the delta is expressed as an absolute number or a percentage and that difference is applied to the zones of the frames.

Each of the frames and audio are provided 234 in synchronization, for example by delaying the audio corresponding to the frame by the amount of time required to process the frame in step 232, as part of a video output from the filter app. The frames from the video and audio, modified as described herein, are provided in one embodiment to a videoconferencing server, which distributes the video and audio to other computer systems in the manner of a conventional videoconferencing server, such as is available from ZOOM COMMUNICATIONS INC.

System

Figure 3:
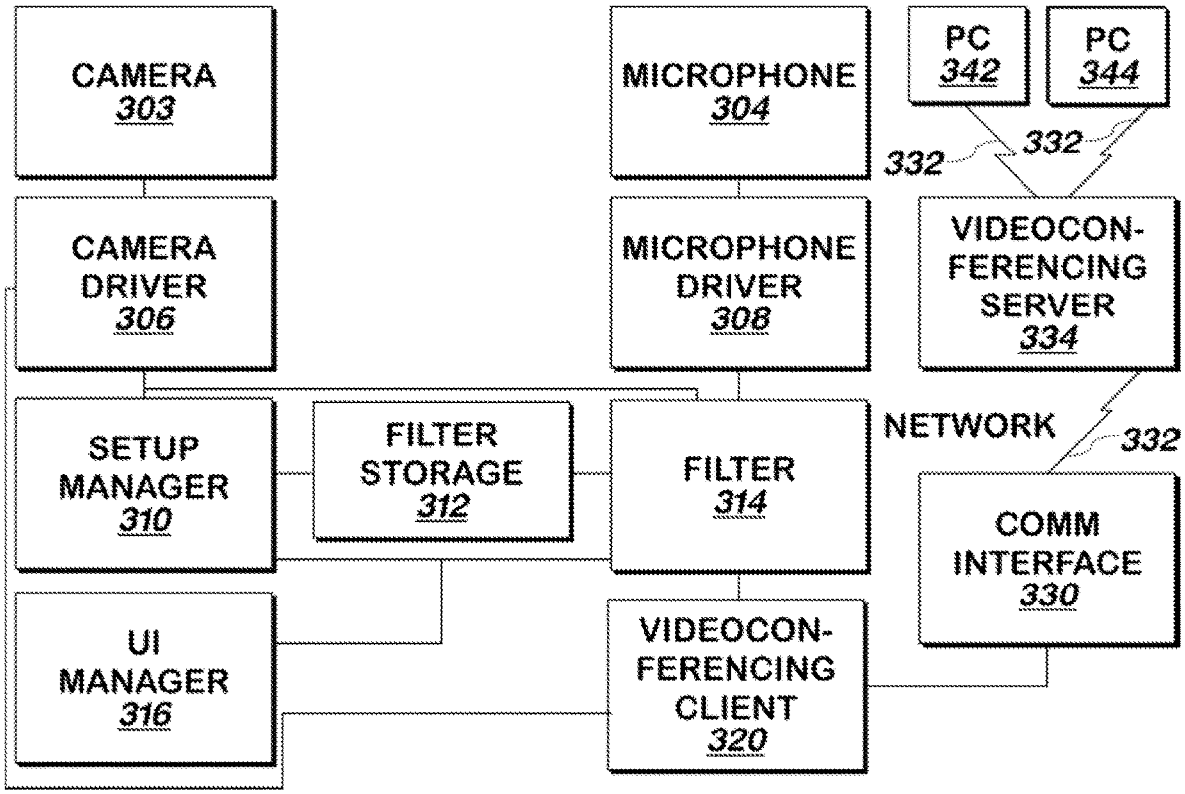
FIG. 3 is a block schematic diagram of a system for providing audio and video output according to one embodiment of the present invention.

Referring now to FIG. 3, a system for providing audio and video output is shown according to one embodiment of the present invention. The system is shown in the context of a videoconference, though it may be used in other contexts as well. Camera 303 and microphone 304 may include parts of a conventional webcam capable of connection to a computer system, such as a conventional LOGITECH C920× HD PRO Webcam, commercially available at Amazon.com, and camera and microphone drivers 306, 308 are the drivers supplied with that camera, or as part of the operating system of a conventional computer system.

Set up manager 310 receives the base digital photographs and one or more sets of target digital photographs as described above under control of user interface manager 316, which also allows the user to name each look, and for each digital photograph separates them into zones as described above identifies characteristics of the zones and stores the zone boundaries and characteristics into filter storage 312. In one embodiment, zone boundaries are identified using a coordinate system that is itself a function of one or more physical characteristics in the image corresponding to the target digital photographs. If multiple looks are stored, set up manager 310 stores such information associated with the identifier of the look to which the set of target digital photographs corresponds. The identifiers may be received from user interface manager 316, which requests and receives them from the individual and provides them to setup manager 310.

In one embodiment, a set of overlays are pre-supplied in filter storage 312, such as by providing png format images of eyelashes and eyebrows and other features described herein. Setup manager 310 identifies the nearest ones from the target digital photographs and specifies them in filter storage for each look, which the user can change characteristics of using a user interface supplied by user interface manager 316 or the user can select them and define their characteristics as described herein, as each of several looks that the user can name and then select to be output in conjunction with video frames. User interface manager 316 saves the identifiers of the overlays selected by the user and characteristics of each of the overlays specified by the user into filter storage 312. When the look is selected by the user using user interface manager 316, user interface manager signals filter 314 with an identifier of the look, and filter 314 retrieves identifiers of the overlays and characteristics associated with the look specified and uses such information to modify the frames as described herein.

As noted above, set up manager 310 filter storage 312 filter 314 and user interface manager 316 are installed as an additional conventional camera driver and additional conventional microphone driver, in one embodiment or a conventional videocamera in one embodiment. When the individual wishes to participate in a conventional videoconference, such as a TEAMS videoconference provided by MICROSOFT Corporation of Redmond, Washington, the individual selects such additional camera driver and additional microphone driver as inputs to videoconferencing client 320 and may optionally select camera driver 306 and microphone driver 308 as inputs to such additional camera driver and additional microphone driver. Filter 314 receives the outputs of camera driver 306 and microphone driver 308 (which may be a single video camera driver) as specified by the user using user interface manager 316 and identifies the zones and modifies the frames received from camera driver 306 as described above using, as described above, user interface elements supplied by user interface manager 316 via operating system (not shown) of computer system (not shown) on which elements 306 through 320 operate. The user interface elements may allow the individual to select one of several looks as described above, and may include a slider or other similar user interface element to allow the individual to adjust the intensity of the look or change its overlays, colors, hue, saturation, shapes, sizes or other characteristics, which are applied to the video frames as described above. The user can save such changes or save changes to a given look at any time.

Filter 314 provides the frames, modified as described above and herein, and the audio, optionally delayed as described herein to remain in synchronization with the corresponding frame after processing, to videoconferencing client 320, which includes a conventional videoconferencing client, such as the TEAMS videoconferencing client available from MICROSOFT Corporation of Redmond Washington. The user may have selected filter 314 as the video camera source for videoconferencing client 320. Videoconferencing client 320 provides the frames and audio to videoconferencing server 340 via communication interface 330 of the computer system (not shown) on which videoconferencing client 320 operates and via a network 332 such as an Ethernet network, the networks of the Internet or both. Communication interface 330 includes a conventional TCP/IP-compatible communication interface. Videoconferencing server 340 includes a conventional videoconferencing server, such as the TEAMS videoconferencing server, which initiates and maintains videoconferences between the videoconferencing client 320 and similar videoconferencing clients on personal computers 342 and 344, which receive and store in a non transitory digital storage media such as RAM, digital information corresponding to the frames generated as described herein to allow images corresponding to and at least similar to the frames to be displayed on such personal computers 342 and 344 using conventional videoconferencing techniques.

Although elements 310-316 may be part of the computer system in which videoconferencing client 320 is installed, they may be part of a computer system that has no videoconferencing client 320 or they may be part of videoconferencing client 320 or videoconferencing server 340 in other embodiments.

If the videoconferencing client 320 receives from videoconferencing server 334 commands directed towards changing the characteristics of the video being supplied to it, it supplies them to filter 314, which then optionally translates them and supplies them, or supplies them, to camera driver 306 and microphone driver 308 as described above.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Certain Embodiments

Described is a method of supplying video content to a videoconferencing client, including:

- providing a filter application that can select as input a driver for a video camera and is registered to an operating system as an additional video camera driver;
- providing two or more overlays corresponding to physical facial features of a person wearing make up;
- specifying by the filter application characteristics of each of the two or more overlays according to at least one selected from a group including at least one digital photograph and two or more specifications received via a user interface for the filter application;
- receiving by the filter application two or more video frames from the video camera;
- causing to be identified by the filter application two or more zones corresponding to facial features in each of at least some of the two or more video frames;
- modifying by the filter application the two or more video frames responsive to the two or more zones in the respective video frame in the two or more video frames, according to the two or more overlays and the characteristics of each of the two or more overlays; and
- providing the modified video frames to the videoconferencing client that provides digital information responsive to the frames to a videoconferencing server.

The method may additionally include selecting, or receiving a selection of, the two or more overlays from a second plurality of overlays including the two or more overlays and additional overlays.

The method may additionally include:

- saving, by the filter application the specified characteristics associated with a first name;
- specifying or receiving a specification of different characteristics of each of at least some of the two or more overlays; and
- saving, by the filter application, the different characteristics associated with a second name.

The method may contain additional features whereby the modifying step includes directing a computer system to assemble two or more layers, each including at least one overlay, and having an opacity, into a single image.

The method may additionally include:

- receiving by the filter application at least one first command from the videoconferencing client; and
- providing by the filter application at least one second command to the driver for the video camera responsive to the at least one first command.

The method may additionally include:

- effecting by the filter application a delay in audio received from the driver for the video camera responsive to a time required to modify at least one of the video frames; and
- providing the delayed audio to the videoconferencing client.

Described is a system for supplying video content to a videoconferencing client, including:

- a filter that having an input coupled to a storage for two or more overlays corresponding to physical facial features of a person wearing make up, and selectively coupled to a driver for a video camera for receiving two or more video frames, the filter for registering to an operating system as an additional video camera driver;
- at least one selected from a first group including:
  - a user interface manager for receiving at an input two or more specifications of characteristics of at least one of the overlays, and providing the two or more specifications at an output; and
  - a setup manager having an input for receiving at least one digital photograph the setup manager for providing two or more characteristics including color of the at least one digital photograph at an output; may contain additional features whereby
  - the filter input is additionally coupled to at least one selected from a second group including the user interface manager output for receiving the two or more specifications and the setup manager output for receiving the two or more characteristics;

the filter is additionally for specifying characteristics of each of the two or more overlays responsive to at least one selected from a third group including the two or more specifications and the two or more characteristics;

the filter input is additionally for receiving two or more video frames from the video camera;

the filter is additionally for:

causing to be identified two or more zones corresponding to facial features in each of at least some of the two or more video frames;

modifying the two or more video frames responsive to the two or more zones in the respective video frame in the two or more video frames, according to the two or more overlays and the characteristics of each of the two or more overlays; and providing the modified video frames at an output coupled to to the videoconferencing client that provides digital information responsive to the frames to a videoconferencing server.

The system may contain additional features whereby:

the filter input is additionally for receiving a selection of the two or more overlays from a second plurality of overlays including the two or more overlays and at least one additional overlay.

The system may contain additional features whereby the user interface manager input is additionally for receiving a first name, two or more specifications of different characteristics of each of at least some of the two or more overlays, and a second name, and the user interface manager is additionally for saving in the storage coupled to the user interface manager output the two or more specifications of the at least one of the overlays, associated with a first name, and saving the different characteristics, associated with the second name.

The system may contain additional features whereby the modifying by the filter includes directing a computer system to assemble two or more layers, each including at least one overlay, and each having an opacity, into a single image.

The system may contain additional features whereby:

the filter input is additionally for at least one first command from the videoconferencing client; and the filter is additionally for providing at the filter output at least one second command to the driver for the video camera responsive to the at least one first command.

The system may contain additional features whereby the filter additionally receives at the filter input audio received from the driver for the video camera, and the filter is additionally for providing the audio to the videoconferencing client via the filter output after a delay responsive to a time required to modify at least one of the two or more the video frames.

Described is a computer program product including a nontransitory computer useable medium having computer readable program code devices embodied therein for supplying video content to a videoconferencing client, the computer readable program code devices configured to cause a computer system to:

provide a filter application that can select as input a driver for a video camera and is registered to an operating system as an additional video camera driver;

provide two or more overlays corresponding to physical facial features of a person wearing make up;

specify by the filter application characteristics of each of the two or more overlays according to at least one selected from a group including at least one digital photograph and two or more specifications received via a user interface for the filter application;

receive by the filter application two or more video frames from the video camera;

cause to be identified by the filter application two or more zones corresponding to facial features in each of at least some of the two or more video frames;

modify by the filter application the two or more video frames responsive to the two or more zones in the respective video frame in the two or more video frames, according to the two or more overlays and the characteristics of each of the two or more overlays; and provide the modified video frames to the videoconferencing client that provides digital information responsive to the frames to a videoconferencing server.

The computer program product may additionally include computer readable program code devices configured to cause the computer system to select, or receive a selection of, the two or more overlays from a second plurality of overlays including the two or more overlays and additional overlays.

The computer program product may additionally include computer readable program code devices configured to cause the computer system to:

save, by the filter application the specified characteristics associated with a first name;

specify or receiving a specification of different characteristics of each of at least some of the two or more overlays; and save, by the filter application, the different characteristics associated with a second name.

The computer program product may contain additional features whereby the computer readable program code devices configured to cause the computer system to modify includes computer readable program code devices configured to cause the computer system to direct a computer system to assemble two or more layers, each including at least one overlay, and having an opacity, into a single image.

The computer program product may additionally include computer readable program code devices configured to cause the computer system to:

receive by the filter application at least one first command from the videoconferencing client; and provide by the filter application at least one second command to the driver for the video camera responsive to the at least one first command.

The computer program product may additionally include computer readable program code devices configured to cause the computer system to:

effect by the filter application a delay in audio received from the driver for the video camera responsive to a time required to modify at least one of the video frames; and provide the delayed audio to the videoconferencing client.

What is claimed is:

1. A method of supplying video content to a videoconferencing client, comprising:

providing a filter application that can select as input a driver for a video camera and is registered to an operating system as an additional video camera driver;

providing a plurality of overlays corresponding to physical facial features of a person wearing make up;

specifying, by the filter application, characteristics of each of the plurality of overlays according to at least one selected from a group comprising at least one digital photograph and a plurality of specifications received via a user interface for the filter application;

receiving by the filter application a plurality of video frames from the video camera;

causing to be identified by the filter application a plurality of zones corresponding to facial features in each of at least some of the plurality of video frames;

modifying, by the filter application, the plurality of video frames responsive to the plurality of zones in each respective video frame in the plurality of video frames, according to the plurality of overlays and the characteristics of each of the plurality of overlays; and providing the modified video frames to the videoconferencing client that provides digital information responsive to the modified video frames to a videoconferencing server.

2. The method of claim 1, additionally comprising selecting, or receiving a selection of, the plurality of overlays from a second plurality of overlays comprising the plurality of overlays and additional overlays.

3. The method of claim 1, additionally comprising:

saving, by the filter application the specified characteristics associated with a first name;

specifying or receiving a specification of different characteristics of each of at least some of the plurality of overlays; and saving, by the filter application, the different characteristics associated with a second name.

4. The method of claim 1, wherein the modifying step comprises directing a computer system to assemble a plurality of layers, each comprising at least one overlay of the plurality of overlays, and having an opacity, into a single image.

5. The method of claim 1, additionally comprising:

receiving by the filter application at least one first command from the videoconferencing client; and providing by the filter application at least one second command to the driver for the video camera responsive to the at least one first command.

6. The method of claim 1, additionally comprising:

effecting by the filter application a delay in audio received from the driver for the video camera responsive to a time required to modify at least one of the video frames; and providing the delayed audio to the videoconferencing client.

7. A system for supplying video content to a videoconferencing client, comprising:

a filter having an input coupled to a storage for a plurality of overlays corresponding to physical facial features of a person wearing make up, and selectively coupled to a driver for a video camera for receiving a plurality of video frames, the filter for registering to an operating system as an additional video camera driver;

at least one selected from a first group comprising:

a user interface manager for receiving at an input a plurality of specifications of characteristics of at least one of the plurality of overlays, and providing the plurality of specifications at an output; and a setup manager having an input for receiving at least one digital photograph, the setup manager for providing a plurality of characteristics comprising color of the at least one digital photograph at an output; and wherein the filter input is additionally coupled to at least one selected from a second group comprising the user interface manager output for receiving the plurality of specifications and the setup manager output for receiving the plurality of characteristics;

the filter is additionally for specifying characteristics of each of the plurality of overlays responsive to at least one selected from a third group comprising the plurality of specifications and the plurality of characteristics;

the filter input is additionally for receiving a plurality of video frames from the driver of the video camera;

the filter is additionally for:

causing to be identified a plurality of zones corresponding to the facial features in each of at least some of the plurality of video frames;

modifying the plurality of video frames, responsive to the plurality of zones in each respective video frame in the plurality of video frames, according to the plurality of overlays and the characteristics of each of the plurality of overlays; and providing the modified video frames at an output coupled to the videoconferencing client that provides digital information responsive to the modified video frames to a videoconferencing server.

8. The system of claim 7, wherein:

the filter input is additionally for receiving a selection of the plurality of overlays from a second plurality of overlays comprising the plurality of overlays and at least one additional overlay.

9. The system of claim 7, wherein the user interface manager input is additionally for receiving a first name, a plurality of specifications of different characteristics of each of at least some of the plurality of overlays, and a second name, and the user interface manager is additionally for saving in the storage coupled to the user interface manager output the plurality of specifications of the at least one of the plurality of overlays, associated with the first name, and saving the different characteristics, associated with the second name.

10. The system of claim 7, wherein the modifying by the filter comprises directing a computer system to assemble a plurality of layers, each comprising at least one overlay of the plurality of overlays, and each having an opacity, into a single image.

11. The system of claim 7, wherein:

the filter input is additionally for receiving at least one first command from the videoconferencing client; and the filter is additionally for providing at the filter output at least one second command to the driver for the video camera responsive to the at least one first command.

12. The system of claim 7, wherein the filter additionally receives at the filter input audio received from the driver for the video camera, and the filter is additionally for providing the audio to the videoconferencing client via the filter output after a delay responsive to a time required to modify at least one of the plurality of the video frames.

13. A computer program product comprising a nontransitory computer useable medium having computer readable program code devices embodied therein for supplying video content to a videoconferencing client, the computer readable program code devices configured to cause a computer system to:

provide a filter application that can select as input a driver for a video camera and is registered to an operating system as an additional video camera driver;

provide a plurality of overlays corresponding to physical facial features of a person wearing make up;

specify, by the filter application, characteristics of each of the plurality of overlays according to at least one selected from a group comprising at least one digital photograph and a plurality of specifications received via a user interface for the filter application;

receive by the filter application a plurality of video frames from the video camera;

cause to be identified by the filter application a plurality of zones corresponding to facial features in each of at least some of the plurality of video frames;

modify, by the filter application, the plurality of video frames responsive to the plurality of zones in each respective video frame in the plurality of video frames, according to the plurality of overlays and the characteristics of each of the plurality of overlays; and provide the modified video frames to the videoconferencing client that provides digital information responsive to the modified video frames to a videoconferencing server.

14. The computer program product of claim 13, additionally comprising computer readable program code devices configured to cause the computer system to select, or receive a selection of, the plurality of overlays from a second plurality of overlays comprising the plurality of overlays and additional overlays.

15. The computer program product of claim 13, additionally comprising computer readable program code devices configured to cause the computer system to:

save, by the filter application the specified characteristics associated with a first name;

specify or receiving a specification of different characteristics of each of at least some of the plurality of overlays; and save, by the filter application, the different characteristics associated with a second name.

16. The computer program product of claim 13, wherein the computer readable program code devices configured to cause the computer system to modify comprises computer readable program code devices configured to cause the computer system to direct a computer system to assemble a plurality of layers, each comprising at least one overlay of the plurality of overlays, and having an opacity, into a single image.

17. The computer program product of claim 13, additionally comprising computer readable program code devices configured to cause the computer system to:

receive by the filter application at least one first command from the videoconferencing client; and provide by the filter application at least one second command to the driver for the video camera responsive to the at least one first command.

18. The computer program product of claim 13, additionally comprising computer readable program code devices configured to cause the computer system to:

effect by the filter application a delay in audio received from the driver for the video camera responsive to a time required to modify at least one of the video frames; and provide the delayed audio to the videoconferencing client.

* * * * *